United States Patent Office 2,924,952
Patented Feb. 16, 1960

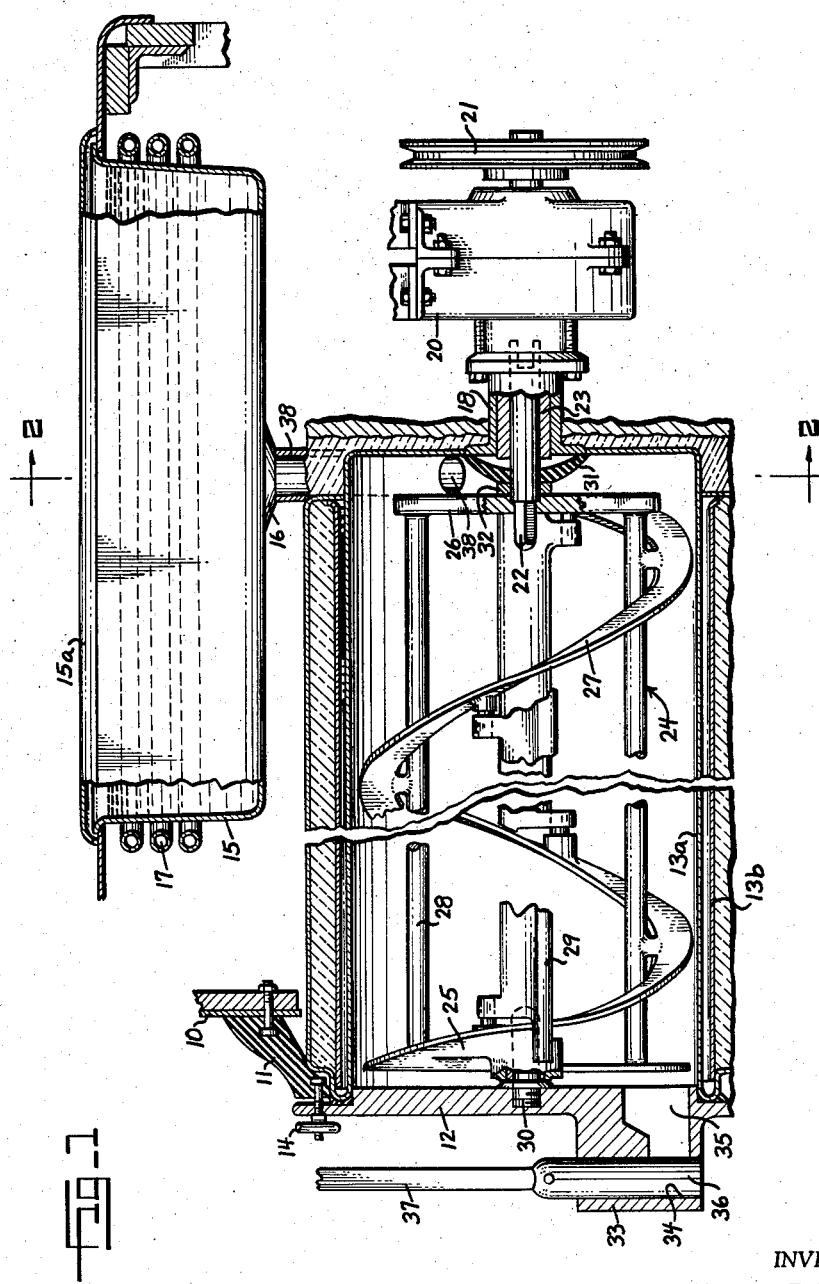

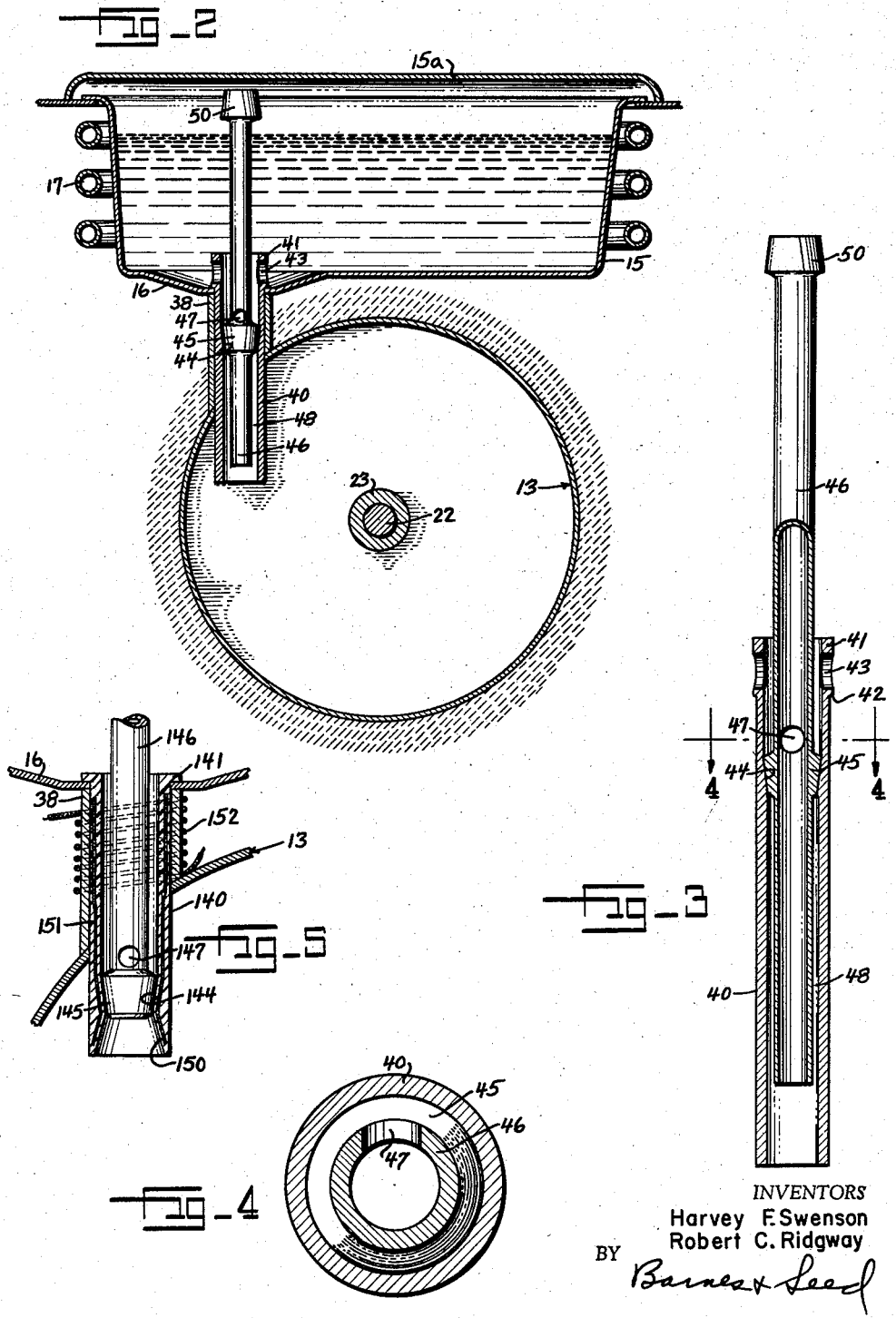

2,924,952
MIX-AND-AIR FEEDING SYSTEM AND DEVICE FOR FREEZERS

Harvey F. Swenson and Robert C. Ridgway, Seattle, Wash.

Application May 27, 1957, Serial No. 661,808

17 Claims. (Cl. 62—304)

This invention relates to an improved system and device for feeding mix and air to freezers which operate to produce and dispense frozen mix-and-air products, such, for example, as milkshakes and "soft" ice-cream. In freezers of this type the freezing cylinder in which the product is produced has an admission opening for periodic introduction of mix and an outlet opening through which the frozen product is dispensed. The freezing head which contains the cylinder is connected in a refrigeration circuit which includes a motor-driven compressor, and within the cylinder there is provided a dasher, also motor-driven, which operates during the freezing action to whip air into the mix so as to give the product the proper consistency. The dasher also urges the frozen product toward the dispensing opening and consequently is activated during each successively performed dispensing operation.

It is the principal object of the present invention to provide an improved feeding system and device by which charges of mix and air are fed to the freezing cylinder automatically from a mix tank and the atmosphere, respectively, as each of a succession of servings of frozen product are made, the effective volume of each such charge being only so large as is necessary to replenish the product dispensed, and hence making the freezer a "continuous operation" unit in the sense that, throughout a business day, it is never necessary to hold the machine out of use once an original batch has been brought to serving condition.

The invention also aims to provide such a feeding device in which a liquid head greater than the depth of mix within the mix tank determines the rate of flow of mix from the tank to the freezing cylinder.

Another object is to provide such a feeding device which admits of having all of its parts which come into contact with the mix or frozen product thoroughly cleaned, and wherein such cleaning can be performed with ease and expedition.

Furthermore, the invention aims to provide an improved mix-and-air feeding device which is of simple and economical construction and has no moving parts during operation.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a fragmentary longitudinal vertical sectional view of a freezer incorporating our feeding system and ready to receive our feeding device.

Fig. 2 is a fragmentary transverse vertical sectional view drawn to a larger scale on line 2—2 of Fig. 1 and showing our feeding device in operation position.

Fig. 3 is a longitudinal veritcal sectional view of the feeding device to a yet larger scale.

Fig. 4 is a transverse sectional view taken to an enlarged scale along the line 4—4 of Fig. 3.

Fig. 5 is a fragmentary view taken similarly to Fig. 2 and illustrating a modified feeding device in operative position.

The freezer to which the present invention is illustrated as applied is housed in a cabinet whose front wall 10 provides a circular opening circumscribed by a fixedly secured insulating collar 11. A removable front 12 for the unit's freezing cylinder 13 is held against the collar by thumb screws 14. In the top wall of the cabinet there is provided a relatively large opening, and set into this opening is a tank 15 for the mix, such tank having a removable cover 15a and a dished floor well 16 providing an outlet. The recess in which the tank is received is surrounded by an insulated jacket, and within the jacket in direct contact with the inner shell thereof is a cooling coil 17. Refrigerant gas, preferably Freon, after having previously performed a primary refrigerating function for the freezing cylinder, is fed in a moderately cold condition to and from said cooling coil.

The freezing cylinder is a hollow-walled structure composed of spaced inner and outer shells 13a, 13b joined at the ends by weld seams. At the back there is provided a rearwardly extending tubular prolongation 18, and this prolongation derives support from a gear box 20 mounted in the cabinet. Reduction gears contained in the gear box are powered by a pulley 21 driven by a belt from an electric motor. Driven off the output end of the gear box is a jack-shaft 22 which projects into the cylinder and takes a journal in a bushing 23. A dasher 24 provides headers 25 and 26 at its front and rear ends, respectively, between which extend a helically developed dasher blade 27 and alternating pairs of stay rods 28 and scraper blades 29. The front header is auger-like and has a round center opening into which there is received a journal pin 30 carried by the freezer front 12 while the rear header presents a squared center socket into which the front end of the jack-shaft 22 fits.

Designated by 31 is a seal which surrounds the jack-shaft, and by means of an intervening friction washer 32 this seal is tensioned by the dasher so as to bear tightly against the front face of the cylinder's rear wall. The seal is comprised of a generally cone-shaped body of elastic rubber, so made that end force transmitted from the freezer front to the dasher causes the rubber body to be distorted and its rim stretched to torsion said rim against the back wall of the cylinder.

The freezer front 12 presents a forwardly projecting nose 33 in which there is provided a vertical through-bore 34, and leading into this bore from the front end of the freezer cylinder is a feed passage 35. A solid cylindrical plunger valve 36, functioning as a serving gate, is journaled for endwise sliding movement in said bore from a lower closed position to an upper open position whereat the frozen product within the freezer cylinder is enabled to be dispensed. The gate, which is relatively heavy so as to move by gravity into closed position, may be solenoid-raised into open position or may also be opened by hand. For this latter purpose there is provided an arm 37 projecting laterally from the upper exposed end of the gate.

It will be noted that the inner shell 13a of the freezing cylinder 13 extends rearwardly beyond the outer shell and the rear header 26 and is provided with an upwardly extending feed neck 38 which is offset with respect to the longitudinal axis of the cylinder. This feed neck connects at its upper end to the mix tank well 16 to receive our feeding device and the fact that it is in a non-refrigerated portion of the freezing cylinder and rearwardly of the dasher is important in helping to prevent the lower ends of the feeding device from becoming clogged by frozen product.

The feeding device illustrated in Figs. 2–4 is preferred when the frozen product is to be a milkshake. This device has a supply pipe 40 which mates diametrically speaking with the feed neck 38 and projects by its lower end well into the freezing cylinder. At its upper end the supply pipe has an enlarged head 41 which is machined upon its underside to produce a beveled shoulder 42 capable of making a liquid-tight joint where the same shoulders upon the floor of the well 16. There are openings 43 at diametrically opposite sides of the head 41 leading from the well to the interior of the pipe 40. At a point elevated above its bottom end the pipe is formed interiorly with a conical seat 44, and received within the pipe and at its lower end presenting a conical enlargement 45 which fits this seat is a hollow stem 46 of a diameter less than the interior diameter of the pipe. The stem has a length such that its upper end projects beyond the pipe to a height above the full level of mix within the tank 15. One or more orifices or ports 47 are provided in the wall of the stem immediately above the conical enlargement 46 to connect the interior of the stem with the space between the supply pipe and the stem, this space communicating with mix in the tank by the open upper end of the supply pipe and the openings 43.

To initially charge the freezing cylinder 13 it is only necessary to fill the mix tank 15 and start the machine so as to refrigerate the cylinder and coincidently turn the dasher 24. Mix from the tank will flow through the openings 43 and down into the stem 46 through the port 47 to feed into the freezing cylinder. At the same time the cylinder has communication with the atmosphere via the stem since the upper end of the latter is above the level of the mix in the tank. In some instances it may be preferred to give a faster initial charge to the freezing cylinder by manually unseating the stem 46 from the supply pipe 40 so that mix can pour from the tank into the cylinder without the restriction of the port 47, and then, when the resulting initial surge of air escaping from the freezing cylinder has appeared at the top of the mix tank in the form of large bubbles, the stem can be reseated so that the mix and air supply will be metered thereafter.

The construction of the dasher is such that it whips air into the mix as the latter is being frozen, and at the same time pushes the mix forwardly within the cylinder, creating an internal pressure. By the action of the dasher, a front-end portion of the cylinder comprehending well in excess of one-half the overall length will become filled with the frozen product when the latter reaches serving consistency. Within the remaining rear-end portion of the cylinder the profile configuration of the product, considered in longitudinal vertical section, will suggest a wave, being flush with or moderately above the low point of the supply pipe's bottom end at the rear end of the cylinder and thence rising rather steeply in an upward sweep, much in the nature of a sinusoid curve, merging with the ceiling line of the cylinder at a point spaced somewhat to the front of the supply pipe.

Within the supply pipe 40 both the interior of the hollow stem 46 and the space surrounding such stem will contain mix, when the freezing cylinder becomes fully charged with frozen product, but this mix is precluded from entering the cylinder as long as the charge of mix within the latter is flush with or above the outlet end of the supply pipe. While a serving of frozen product is dispensed, the dasher 24 is in operation to force it toward the freezer outlet 35, and hence, as a result, the lower end of the supply pipe 40 becomes exposed and the pressure within the cylinder drops proportionately with the amount of product dispensed. Thereupon a replacement of fresh mix automatically flows through the supply pipe into the freezing cylinder, this replacement being initially a charge of mix alone to clear the hollow stem 46 followed by a larger volume of a blend of air and mix. It should be here pointed out that the liquid capacity of the supply pipe, including the inner stem, is little more than half an ounce, hence assuring the desired overrun of air. The air chamber 48 which surrounds the hollow stem's lower end below the conical enlargement 45 serves an insulating function helping to prevent mix contained in the stem at the outlet end of the latter from being subjected to a substantial freeze. In this regard, the supply pipe 40 is desirably formed from a material having a low thermal conductivity. Should any partially frozen product occupy the lower end of the stem, the same is easily pulled therefrom in response to a dispensing operation, due to the unobstructed nature of said lower end of the stem.

It will be appreciated that the rate of flow of mix from the tank 15 through the openings 43 and down into the stem 46 through the port 47 during each mix-and-air replenishing operation is dependent upon the liquid head from the port up to the top level of the mix. This top level, of course, varies as the tank empties, but the port 47 is small enough to assure that adequate air will flow down through the stem 46 into the freezing cylinder. In other words, the flow capacity of the stem 46 must exceed that of the port in accordance with the desired air-mix ratio. Also of significance is the fact that since the port 47 is spaced well below the bottom of the mix tank, the maximum liquid head gradient at the port due to this variance in mix level in the tank will not have zero as a lower end limit, but rather will have the ratio of the distance between the port and openings 43 to the distance between the port and the full level of the mix. In normal practice the operator of the machine will keep adding mix to the tank 15 from time-to-time during a day's operation so that rarely before closing down the machine at the end of the day will the mix level actually be as low as openings 43. Hence, as a practical matter, the liquid head at the port 47 will fluctuate through a narrower range than the dimensions would appear to dictate.

During cleaning or other operations it may be desirable from time to time for the machine operator to be able to shut off the flow of mix from the tank 15 to the freezing cylinder 13. For this purpose the upper end of the stem 46 is formed with a hollow conical stopper 50 which matches the conical enlargement 45 and faces in the opposite direction so that it will fit the seat 44. Thus, all the operator has to do in order to stop the flow of mix is to withdraw the stem from the supply pipe 40, quickly turn the stem end for end and lower it into the supply pipe until the seat 44 is engaged by the stopper 50. This will prevent mix above the seat from flowing into the stem and thence down into the freezing cylinder since the only opening in the stem will now be above the mix level.

Cleaning of my feeding device can be readily accomplished after lifting the device free of the feed neck 38 and mix tank. The stem 46 can perforce be separated from the supply pipe 40 so that they can be washed individually. With the feeding device removed, scouring and rinsing solutions can be circulated from the mix tank 15 through the feed neck into the freezing cylinder to thoroughly clean the inside of the machine.

In Fig. 5 we have shown a modified feeding device which is particularly advantageous for use when the frozen product is colder than a milkshake, such, for example, as "soft" ice cream. One of the primary purposes of the modified device in such an instance is to prevent the lower end thereof from becoming blocked by frozen mix or product. It will be noted that the modified device has a supply pipe 140 and hollow stem 146 corresponding functionally to the like named parts of the aforedescribed feeding device. At its upper end the supply pipe 140 has an annular flange 141 shouldering upon the floor of the mix tank well 16, and toward its lower end the pipe is interiorly formed with a conical seat 144. For engaging this seat the lower end of the stem 146 is provided with a beveled enlargement 145. Above the latter the stem has an orifice or port 147, as before, to connect the interior of the stem with the space between the supply pipe and stem, and thence with the mix tank by the open upper end of the supply pipe. The interior surface of the supply pipe 140 below the seat 144 is preferably beveled outwardly toward the lower end of the pipe as at 150.

It will be noted that the supply pipe 140 has a core 151 which should be of aluminum or some other material of relatively high thermal conductivity whereas the supply pipe proper should be formed from a material of relatively low thermal conductivity such as suitable plastic. The core should be close to the external surface of the supply pipe in the region surrounded by the feed neck 38 and close to the interior surface of the pipe therebelow, and particularly the seat 144 and beveled surface 150.

In the modified version, it should be noted that the feed neck 38 is wound with an electrical heating coil 152 or subjected to some other suitable source of heat and hence should have good thermal conductivity so that heat from the coil will be efficiently conducted to the supply pipe 140. With the thermally conductive core 151 close to the exterior surface of the supply pipe within the feed neck, heat is transmitted through the skin of the supply pipe from the heated feed neck and thence is conducted by the core to warm the skin of the seat 144 and beveled portion 150. There is no intention that the outer surface of the part of the supply pipe within the freezing cylinder be warmed, and in face, the thermal insulating effect of the supply pipe material external of the core portion surrounding the seat 144 and bevel 150 is purposed to cause a concentration of the administered heat on the inner surface of such part. It is preferred to have the stem 146 of metal giving good thermal conductivity so that the lower enlarged end thereof will be warmed by contact with the heated seat 144.

Operation of our modified feeding device is the same as before described, the heating arrangement making it possible to have the port 147 actually within the freezing cylinder without danger of becoming clogged by frozen mix when the freezing cylinder temperatures are lower than normally required for forming milkshakes. From time to time the frozen product may be pushed up into the foot of the supply pipe 140. The bevel of the outlet portion 150 and the heating thereof assure that any such frozen product will readily free itself before or at the start of a mix feeding operation. It will be appreciated that functionally the core 151 would be more efficient if externally exposed toward the top for direct contact with the feed neck 38 and if internally exposed toward the bottom for direct contact with the enlarged lower end portion 145 of the stem and with any frozen mix forced into the internally beveled lower end of the supply pipe. The purpose of covering such upper external and lower internal surfaces with a thin layer of the material of the supply pipe proper is primarily to provide uniform uninterrupted inner and outer surfaces for cleaning.

It is thought that the invention will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

We claim:

1. In a mix-and-air feeding system, a freezing cylinder having an inlet for entry of air and liquid mix at one end and an outlet at the other end for discharging a frozen mixture of air and mix, dasher means journal-mounted for rotation in said cylinder and adapted when turning to urge said frozen mixture toward said outlet end, a liquid mix tank higher than said freezing cylinder, and an elongated feeding device extending into said inlet of the freezing cylinder by an open lower end to a level below the top of the cylinder and having a port located below the bottom level of said tank and intercommunicating with the liquid mix at said bottom level, said device having a tubular extension extending by an open upper end above said port to a level above the maximum level of liquid mix within said tank for the entry of air, and said port having a smaller area than the interior cross-sectional area of said tubular extension.

2. In a mix-and-air feeding system, a freezing cylinder having a radially facing inlet at its rear end laterally offset relative to the longitudinal center axis of the cylinder for the entry of air and liquid mix and having an outlet at its front end for discharging a frozen mixture of air and mix, the portion of said cylinder from the front of said inlet rearwardly being free of direct refrigeration, dasher means journal-mounted for rotation in said cylinder and arranged to work forwardly of said inlet and adapted to urge said frozen mixture forwardly toward said outlet, a liquid mix tank higher than said freezing cylinder, and an elongated feeding device extending to said inlet of the cylinder by an open lower end and having a port located below the bottom level of said tank and intercommunicating with said bottom level, said device having a tubular extension extending by an open upper end above said exterior opening to a level above the maximum level of liquid mix within said tank for the entry of air to combine with mix flowing from said tank through said exterior opening, said tubular extension having a larger interior cross-sectional area than the area of said port.

3. In a mix-and-air feeding system, a freezing cylinder having a radially facing inlet at its rear end laterally offset relative to the longitudinal center axis of the cylinder for the entry of air and liquid mix and having an outlet at its front ends for discharging a frozen mixture of air and mix, the portion of said cylinder from the front of said inlet rearwardly being free of direct refrigeration, dasher means journal-mounted for rotation in said cylinder and arranged to work forwardly of said inlet and adapted to urge said frozen mixture forwardly toward said outlet, a liquid mix tank above said freezing cylinder and having an egress opening overlying said inlet to the freezing cylinder, an open-ended pipe having an enlarged head at its upper end seating on the rim of said egress opening and depending by its lower end into the freezing cylinder inlet, and an open-ended inner tube having an interfit with said pipe below said enlarged head and projecting by its upper end above the pipe for the entry of air above the mix in the mix tank, said tube having an outer diameter of said pipe to provide an annular passage for mix entering the pipe through its said head, and being formed with a port above said interfit and entering said annular passage whereby said mix entering the pipe is combined with said air entering the tube and discharges therewith from the lower end of the tube.

4. For a mix-and-air feeding system, a feeding device comprising, an open ended outer pipe having an enlarged head at its upper end adapted to seat on the rim of an outlet opening in the bottom of a mix tank, and an open-ended inner tubular stem having an interfit with said pipe below said enlarged head and projecting by its upper end above the pipe for the entry of air above the mix in the mix tank, said stem having an outer diameter above said interfit less than the inner diameter of said pipe to provide an annular passage for mix entering the pipe through its said head, and said stem being formed with a port above said interfit and entering said annular passage whereby said mix entering the pipe is combined with said air entering the stem and discharges therewith from the lower end of the stem.

5. The combination of claim 4 in which said stem is detachably associated with said pipe at their said interfit.

6. The combination of claim 4 in which the area of said port in the stem is less than the minimum inside cross-sectional area of the stem.

7. The combination of claim 4 in which said enlarged head of the pipe merges at its lower end with the pipe proper by a downwardly beveled shoulder.

8. The combination of claim 7 in which said enlarged head of the pipe has a radial opening therethrough closely adjacent said shoulder.

9. The combination of claim 4 in which said pipe and stem extend below said interfit and have an annular space therebetween below such interfit.

10. The combination of claim 4 in which said port in the stem is located closely adjacent said interfit.

11. The combination of claim 4 in which said pipe extends below said interfit by its lower end and has the mouth of said lower end flared.

12. For a mix-and-air feeding system, a feeding device comprising, an open-ended outer pipe having an enlarged head at its upper end adapted to seat on the rim of an outlet opening in the bottom of a mix tank and formed with an upwardly facing interior seat of reduced diameter spaced below said head, and an open-ended inner tubular stem removably fitting by its lower end into said pipe and formed with an exterior enlargement mating with said seat, the outer diameter of said stem above said enlargement being less than the inside diameter of said pipe above said seat to provide an annular passage for mix entering the pipe through its said enlarged head, and the upper end of the stem extending above said enlarged head of the pipe so as to project above the top level of the mix in the mix tank with which the feeding device is to be operatively associated to thereby serve as an air inlet, said stem being formed with a port above its said enlargement and entering said annular passage whereby mix entering through said enlarged head of the pipe is combined with air entering through the upper end of the stem and discharges therewith from the lower end of the stem.

13. The combination of claim 12 in which said stem has its upper end externally formed with an inverted stopper of a size and shape mating with said seat when said stem is turned end for end.

14. The combination of claim 12 in which said pipe has a thermally conductive core which has an upper portion close to the outer surface of the pipe in the region between its said head and seat and which has a lower portion close to the surface of said seat, said core having greater thermal conductivity than the pipe proper.

15. The combination of claim 12 in which said pipe extends below its said seat and has a thermally conductive core which has an upper portion close to the outer surface of the pipe in the region between its said head and seat, and which has a lower portion which is close to the inner surface of said pipe in the region below its said seat.

16. In a mix-and-air feeding system, a freezing cylinder having an inlet, a liquid mix tank higher than said freezing cylinder and having an outlet, a thermally conductive hollow feed neck connecting said outlet and inlet together, heating means for heating said feed neck above the temperature of said freezing cylinder and mix tank, and elongated hollow mix-and-air feeding means extending into said feed neck and operatively communicating with the interior of said mix tank and with a source of air, said feeding means having a thermally conductive core which is more thermally conductive than the feeding means proper, said core having its upper portion close to said feed neck and its lower portion close to the inside surface of said feeding means near the lower discharge end of the latter, whereby mix is prevented from freezing at said discharge end.

17. The structure of claim 16 in which said lower portion of the core is closer to the inside surface of said feeding means than to the outside surface thereof.

References Cited in the file of this patent

UNITED STATES PATENTS

| | | |
|---|---|---|
| 822,854 | Cosgrave | June 5, 1906 |
| 1,422,768 | Kent et al. | July 11, 1922 |
| 1,538,102 | Fair | May 19, 1925 |
| 2,522,651 | Van Vleck | Sept. 19, 1950 |
| 2,737,024 | Swenson | Mar. 6, 1956 |
| 2,785,836 | Smith et al. | Mar. 19, 1957 |

FOREIGN PATENTS

| | | |
|---|---|---|
| 810,207 | France | Dec. 19, 1936 |